United States Patent
Väre et al.

(10) Patent No.: US 8,966,543 B2
(45) Date of Patent: Feb. 24, 2015

(54) METHOD AND SYSTEM TO ENABLE ADAPTATION BETWEEN PHYSICAL BEARERS AND OMA-BCAST

(75) Inventors: Jani Petteri Väre, Kaarina (FI); Jyrki Alamaunu, Turku (FI)

(73) Assignee: Nokia Corporation, Espoo (FI)

( * ) Notice: Subject to any disclaimer, the term of this patent is extended or adjusted under 35 U.S.C. 154(b) by 600 days.

(21) Appl. No.: 12/240,779

(22) Filed: Sep. 29, 2008

(65) Prior Publication Data
US 2010/0083311 A1    Apr. 1, 2010

(51) Int. Cl.
*H04N 7/173* (2011.01)
*H04N 5/445* (2011.01)
*H04B 7/00* (2006.01)
*H04N 21/435* (2011.01)
*H04N 7/16* (2011.01)
*H04N 21/235* (2011.01)
*H04N 21/2362* (2011.01)
(Continued)

(52) U.S. Cl.
CPC ............. *H04N 21/435* (2013.01); *H04N 7/163* (2013.01); *H04N 21/235* (2013.01); *H04N 21/2362* (2013.01); *H04N 21/26283* (2013.01); *H04N 21/4345* (2013.01); *H04N 21/482* (2013.01); *H04N 21/64315* (2013.01); *H04W 4/001* (2013.01); *H04L 12/1845* (2013.01); *H04L 12/1881* (2013.01); *H04L 29/06455* (2013.01); *H04W 4/06* (2013.01); *H04L 61/6004* (2013.01)
USPC ............................. 725/62; 725/118; 455/425

(58) Field of Classification Search
CPC ........................................................ H04N 21/61
USPC ............ 725/112, 120, 148, 62, 118; 455/403, 455/414.1, 425
See application file for complete search history.

(56) References Cited

U.S. PATENT DOCUMENTS 8,705,493 B2 * 4/2014 Connors et al. ............... 370/336
2005/0259690 A1 * 11/2005 Garudadri et al. ............ 370/477
(Continued)

FOREIGN PATENT DOCUMENTS

EP          1 838 018       9/2007
JP          2008533896      8/2008
(Continued)

OTHER PUBLICATIONS

U.S. Appl. No. 61/055,953; Xue; May 23, 2008. Specification & Drawings.*
(Continued)

*Primary Examiner* — Pankaj Kumar
*Assistant Examiner* — Reuben M Brown
(74) *Attorney, Agent, or Firm* — Banner & Witcoff, Ltd.

(57) ABSTRACT

Systems and methods are provided that combine Open Mobile Alliance Mobile Broadcast Services (OMA BCAST) with different bearers, such as China Multimedia Mobile Broadcasting (CMMB) by associating service-related identifiers within an OMA BCAST Electronic Service Guide (ESG) with CMMB bearer-specific parameters. Furthermore, associating IP source and/or destination address pairs of a service with the location of the service within the CMMB bearer can be achieved and used with unicast, multicast, and broadcast environments. Further still, systems and methods are provided that allow for ESG bootstrapping, where a desired electronic service guide can be discovered by bootstrapping, e.g., OMA BCAST ESG.

39 Claims, 12 Drawing Sheets

(51) Int. Cl.
*H04N 21/262* (2011.01)
*H04N 21/434* (2011.01)
*H04N 21/482* (2011.01)
*H04N 21/643* (2011.01)
*H04W 4/00* (2009.01)
*H04L 12/18* (2006.01)
*H04L 29/06* (2006.01)
*H04B 17/00* (2006.01)
*H04W 4/06* (2009.01)
*H04L 29/12* (2006.01)

(56) References Cited

U.S. PATENT DOCUMENTS

| | | | | |
|---|---|---|---|---|
| 2008/0070557 | A1* | 3/2008 | Paila et al. | 455/414.1 |
| 2008/0103789 | A1* | 5/2008 | Paila et al. | 705/1 |
| 2008/0189540 | A1 | 8/2008 | Jansky | |
| 2009/0129302 | A1* | 5/2009 | Pekonen et al. | 370/311 |
| 2009/0291631 | A1* | 11/2009 | Xue et al. | 455/3.01 |
| 2010/0037248 | A1* | 2/2010 | Lo et al. | 725/1 |
| 2010/0083311 | A1* | 4/2010 | Vare et al. | 725/39 |
| 2010/0115551 | A1* | 5/2010 | Ke et al. | 725/39 |

FOREIGN PATENT DOCUMENTS

| | | |
|---|---|---|
| WO | WO-2006/097847 | 9/2006 |
| WO | WO-2007/029103 | 3/2007 |
| WO | WO-2008/046643 | 4/2008 |

OTHER PUBLICATIONS

International Search Report for PCT Application No. PCT/IB2009/054146 dated Jan. 19, 2010.
Supplementary European Search Report for EP 09815758 dated Dec. 3, 2012.
First Office Action in CN200980138275.9 dated Nov. 5, 2012.
Third Office Action in CN200980138275.9 dated Jan. 22, 2014.
Office Action in CN200980138275.9 dated Jul. 9, 2013.
Rejection Decision in CN200980138275.9 dated Jul. 18, 2014.

* cited by examiner

| Syntax | Number of bits |
|---|---|
| service_association table () { | |
|   table_id | 8 |
|   section_syntax_indicator | 1 |
|   reserved_future_use | 1 |
|   reserved | 2 |
|   section_length | 12 |
|   reserved | 2 |
|   version_number | 5 |
|   current_next_indicator | 1 |
|   section_number | 8 |
|   last_section_number | 8 |
|   reserved_future_use | 6 |
|   identifier_loop_length | 12 |
|   for (j=0;j<N;j++){ | |
|     identifier_type | 8 |
|     if (identfier_type == URI) { | |
|       uri_length | 8 |
|       for (j=0;j<uri_length;j++){ | |
|         URI_byte | 8 |
|       } | |
|     } else if (identifier_type== IPv4) { | |
|       IPv4_src_addr | 32 |
|       IPv4_dst_addr | 32 |
|     } else if (identifier_type== IPv6) { | |
|       IPv6_src_addr | 128 |
|       IPv6_dst_addr | 128 |
|     } else { // identifier_type == private | |
|       private_length | 12 |
|       for (j=0;j<private_length;j++){ | |
|         private_byte | 8 |
|       } | |
|     } | |
|     serviceID | 16 |
|     reserved_future_use | 6 |
|     MF_ID | 6 |
|     MSF_ID | 4 |
|     frequency_point_number | 8 |
|   } | |
|   CRC_32 | 32 |
| } | |

Figure 1

| Syntax | Number of bits |
|---|---|
| service_association table () { | |
|   table_id | 8 |
|   section_syntax_indicator | 1 |
|   reserved_future_use | 1 |
|   reserved | 2 |
|   section_length | 12 |
|   reserved | 2 |
|   version_number | 5 |
|   current_next_indicator | 1 |
|   section_number | 8 |
|   last_section_number | 8 |
|   reserved_future_use | 6 |
|   identifier_loop_length | 12 |
|   for (j=0;j<N;j++){ | |
|     identifier_type | 8 |
|     if (identfier_type == URI) { | |
|       uri_length | 8 |
|       for (j=0;j<uri_length;j++){ | |
|         URI_byte | 8 |
|       } | |
|     } else if (identifier_type== IPv4) { | |
|       IPv4_addr | 32 |
|     } else if (identifier_type== IPv6) { | |
|       IPv6_addr | 128 |
|     } else { // identifier_type == private | |
|       private_length | 12 |
|       for (j=0;j<private_length;j++){ | |
|         private_byte | 8 |
|       } | |
|     } | |
|     serviceID | 16 |
|   } | |
|   CRC_32 | 32 |
| } | |

Figure 3a

| Syntax | Number of bits |
|---|---|
| service_association table () { | |
|   table_id | 8 |
|   section_syntax_indicator | 1 |
|   reserved_future_use | 1 |
|   reserved | 2 |
|   section_length | 12 |
|   reserved | 2 |
|   version_number | 5 |
|   current_next_indicator | 1 |
|   section_number | 8 |
|   last_section_number | 8 |
|   reserved_future_use | 6 |
|   identifier_loop_length | 12 |
|   for (j=0;j<N;j++){ | |
|     identifier_type | 8 |
|     number_of_identifiers | 8 |
|     for (j=0;j<N;j++){ | |
|     if (identifier_type== IPv4) { | |
|       IPv4_src_addr | 32 |
|       IPv4_dst_addr | 32 |
|     } else if (identifier_type== IPv6) { | |
|       IPv6_src_addr | 128 |
|       IPv6_dst_addr | 128 |
|     } else { // identifier_type == private | |
|       private_length | 12 |
|       for (j=0;j<private_length;j++){ | |
|         private_byte | 8 |
|       } | |
|     } | |
|   } | |
|     serviceID | 16 |
|   } | |
|   CRC_32 | 32 |
| } | |

Figure 3b

METHOD AND SYSTEM TO ENABLE ADAPTATION BETWEEN PHYSICAL BEARERS AND OMA-BCAST

FIELD

Various embodiments relate generally to the field of multimedia broadcast and multicast service systems. More particularly, various embodiments relate to enabling adaptation between a bearer agnostic electronic service guide (ESG), such as that defined by the Open Mobile Alliance (OMA) Mobile Broadcast Services (BCAST) and different physical bearer standards, e.g., the China Multimedia Mobile Broadcasting standard (CMMB).

BACKGROUND

This section is intended to provide a background or context to various embodiments recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Mobile multicast and broadcast systems have recently been standardized by different organizations, such as the 3rd Generation Partnership Project (3GPP) Multimedia Broadcast/Multicast Service (MBMS), the Digital Video Broadcasting (DVB) Technical Module Convergence of Broadcast and Mobile Services (TM-CBMS), and the OMA BCAST organizations. Other multicast and broadcast systems further include Integrated Services Digital Broadcasting—Terrestrial (ISDB-T), Digital Multimedia Broadcast-Terrestrial/Handheld (DMB-T/H), Digital Multimedia Broadcasting (T-DMB), Forward Link Only (FLO) and proprietary systems, such as for example, MediaFLO. Two primary services provided by such multicast/broadcast solutions are streaming and file delivery services.

OMA BCAST refers to an open global standard for mobile services, such as mobile TV and on-demand video services. Such services may be adapted to mobile Internet Protocol (IP)-based content delivery and peer-to-peer content delivery. For example, OMA BCAST supports broadcast technologies such as DVB-Handheld (DVB-H). 3GPP MBMS, and mobile unicast streaming systems. The OMA BCAST standard defines various features including, e.g., electronic service guide, file delivery, streaming content delivery, service and content protection, service provisioning, notifications, etc.

DVB IP Datacast (IPDC) and OMA BCAST define a service guide that carries a description of a service at issue. The IPDC ESG defines, in the Acquisition Fragment, the semantics of component characteristics. A receiving terminal can detect the characteristics of the service and decide whether it can consume the service or not. OMA BCAST has defined a bearer agnostic electronic service guide to be transmitted above different physical bearers.

Electronic service guides enable a terminal to communicate available services to end users (receivers) and to indicate how such services may be accessed. Electronic service guides serve to provide users with information regarding a variety of scheduled programs, allowing a user to navigate, select, and discover content by time, title, channel, genre, etc.

Electronic service guide fragments are independently-existing pieces of the electronic service guide. Electronic service guide fragments can comprise XML documents, Session Description Protocol (SDP) descriptions, textual files, images and other items. Electronic service guide fragments describe one or several aspects of currently available services, future services or broadcast programs. Such aspects may include, for example, free text descriptions, schedules, geographical availability information, prices, purchase methods, genres, and supplementary information such as preview images or clips. Audio, video and other types of data comprising the electronic service guide fragments may be transmitted through a variety of types of networks according to many different protocols. For example, data can be transmitted through the Internet using protocols of the Internet protocol suite, such as Internet Protocol (IP) and User Datagram Protocol (UDP). Data is often transmitted through the Internet addressed to a single user. The data can, however, be multicast (to a set of users) or broadcast to all users in an area.

In an electronic service guide, information is typically presented to a user in terms of time. For example, as individual audio or video programs are scheduled to be presented during specified time periods, the electronic service guide concerning this information can be organized according to these same time periods, such that information about programs that are about to begin will be presented before programs occurring several hours in the future.

CMMB is a mobile TV and multimedia standard developed and specified by the State Administration of Radio, Film, and Television (SARFT) of China, which has been characterized as being similar to the DVB-Satellite services to Handhelds (DVB-SH) standard for satellite and terrestrial broadcasting of digital video. CMMB has specified an application layer agnostic data link layer and physical layer for the transmission of services such as mobile TV. However, utilizing OMA BCAST "on top" of CMMB in order to provide a complete end-to-end system, would result in a lack of mapping between the services signaled within the OMA BCAST ESG and the location of services signaled according to the CMMB specification.

SUMMARY

Various embodiments are described which allow the combining of OMA BCAST with different bearers, such as CMMB by associating service-related identifiers within an OMA BCAST ESG with CMMB bearer-specific parameters. That is, flexible mapping between application layer identifiers, e.g., GlobalserviceID, IP addresses, etc. and CMMB specific locations of the same service is effectuated. The CMMB-specific location is identified with a multiplex frame identifier (MF_ID), a multiplex sub-frame identifier (MS-F_ID), a service identifier (serviceID), and a frequency_point_number. Various embodiments can be used to associate IP source and/or destination address pairs of a service with the location of the service within the CMMB bearer, and can be used in unicast, multicast, and broadcast environments. The OMA BCAST ESG can be transmitted through broadcast network or through any bi-directional interaction network, such as 3G. Also the tables proposed within this application can be transmitted to the terminals through several different paths, e.g. through broadcast network and/or interaction network. Furthermore, the transmission mechanisms for the signaling can be any combination of different signaling through broadcast network and interaction network.

Furthermore, various embodiments are described which allow for electronic service guide bootstrapping, i.e., a desired electronic service guide can be discovered by bootstrapping, e.g., OMA BCAST ESG. In accordance with one electronic service guide bootstrapping embodiment, bootstrap information is discovered from a Bootstrap Service Association Table (BSAT), where, e.g., the BSAT is carried within a particular multiplex frame. After selecting a desired service, a receiver looks for the Service Association Table (SAT), after which the receiver is able to discover the location of the desired service.

These and other advantages and features of various embodiments, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

Embodiments of various embodiments are described by referring to the attached drawings, in which:

FIG. 1 illustrates and end-to-end model of the delivery of an OMA BCAST type of service through a CMMB system in accordance with various embodiments;

FIG. 3a illustrates another exemplary structure and syntax of a Service Association Table in accordance with another embodiment;

FIG. 3b illustrates yet another exemplary structure and syntax of a Service Association Table in accordance with yet another embodiment;

DETAILED DESCRIPTION OF VARIOUS EMBODIMENTS

Various embodiments enable the combining of OMA BCAST with different bearers, such as CMMB by associating service-related identifiers within an OMA BCAST ESG with CMMB elements. It should be noted that the adaptation in accordance with various embodiments described herein between OMA BCAST and CMMB is merely exemplary. The same or substantially similar systems and methods can also be utilized to associate electronic service guide identifiers with elements for other bearers as well, which have similar functionalities. In accordance with various embodiments, a mapping functionality is provided by defining a Service Association Table, which can be used, for example, within a data link layer (in a Program Specific Information/Service Information (PSI/SI) fashion). Additionally, the Service Association Table can be embedded in application layer XML metadata.

Table 1, described below, is an exemplary Service Association Table defined in accordance with various embodiments that provides a mapping between one or more identifiers within an OMA BCAST ESG that have an association with a service. Such an association can be direct, e.g., pointing to the service itself. This type of a direct association can be accomplished through the use of a globalserviceID, for example. Alternatively, the association can be accomplished by pointing to the service by way of one or more IP addresses. The association can also be an indirect association, where pointing to a service is accomplished by pointing to fragments associated with the service. Furthermore, various embodiments include a private data field that can allow new identifiers to be defined in the future.

TABLE 1

| Identifier type type | Description |
| --- | --- |
| GlobalserviceID | 0x01 |
| IPv4 address | 0x02 |
| IPv6 address | 0x03 |
| Service_FragmentID | 0x04 |
| Service Guide fragmentID | 0x05 |
| Access fragmentID | 0x06 |
| The schedule fragmentID | 0x07 |
| The content fragmentID | 0x08 |
| PurchaseData fragmentID | 0x09 |
| Purchase channel fragmentID | 0x0A |
| Reserved_future_use | 0x0B-0xFF |

Identifiers such as those described above can include, but are not limited to, e.g., Universal Resource Identifiers (URIs). URIs are widely used within the signaling of different identifiers according to OMA-BCAST. That is, identifier types, such as those presented in Table 1 are signaled within the Service Association Table. The URIs are used, e.g., for the identification of services (through a GlobalserviceID) or fragments (through fragmentIDs) within the electronic service guide.

Figure 2:
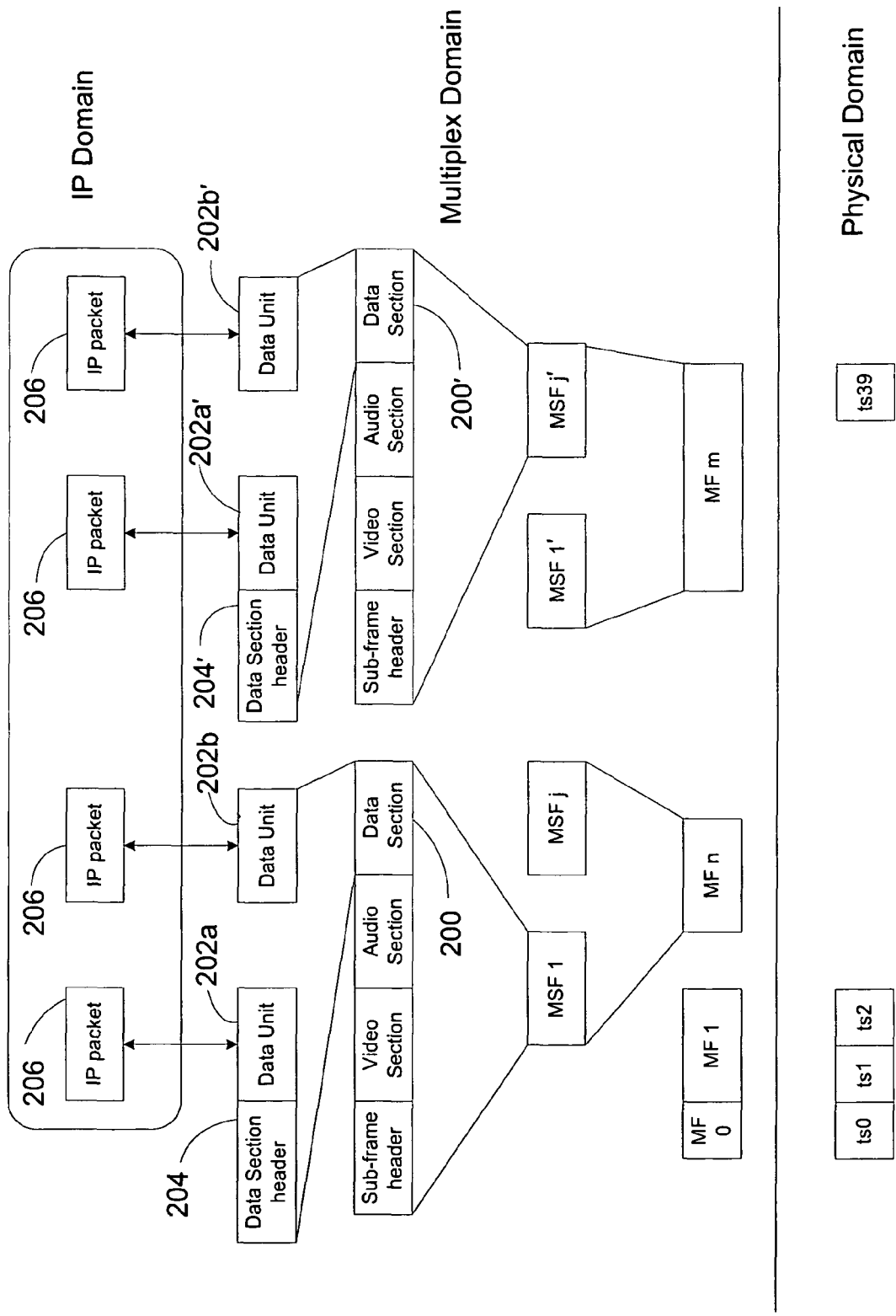
FIG. 2 illustrates an exemplary structure and syntax of a Service Association Table in accordance with one embodiment.

FIG. 1 illustrates an exemplary structure and syntax of a Service Association Table according to one embodiment. FIG. 2 illustrates an end-to-end model of the delivery of OMA BCAST type services through the CMMB system in accordance with this embodiment. According to this one embodiment, the OMA BCAST and/or any other application layer service-specific identifiers are mapped with four CMMB bearer-specific parameters. The four CMMB bearer-specific parameters indicate the location of a service within the CMMB physical layer. For example, the latter parameters can be frequency_point_number, MF_ID, MSF_ID and serviceID.

Earlier parameters listed in FIG. 1 include the following: table_id which refers to an identifier of a table; section_syntax_indicator which refers to a 1-bit field which can be set to "1"; section_length, a 12-bit field that specifies the number of bytes of a section, starting immediately following the section_length field and including the CRC; and version_number which refers to a 5-bit field indicating a version number of the table. It should be noted that the version_number shall be incremented by 1 when a change in the information carried within the table occurs. When the version number reaches a value, e.g., 31, the version number wraps around to 0. When the current_next_indicator, described above, is set to "1," the version_number shall be that of the currently applicable table. When the current_next_indicator is set to "0," then the version_number shall be that of the next applicable table.

Additional parameters include: current_next_indicator, a 1-bit indicator, which when set to "1" indicates that the table is the currently applicable table, and when the bit is set to "0" is indicative that the table sent is not yet applicable and shall be the next table to be valid; and section_number, which is an 8-bit field that gives the number of a section, where the section_number of the first section in the table shall be "0x00." It should be noted that the section_number shall be incremented by 1 with each additional section with the same table_id, service_id, transport_stream_id, and original_network_id. In this case, the table may be structured as a number of segments, where within each segment, the section_number shall increment by 1 with each additional section. However, a gap in numbering is permitted between the last section of a segment and the first section of the adjacent segment.

Further parameters include: last_section_number, an 8-bit field specifying the number of the last section (i.e., the section with the highest section_number) of the table of which this section is a part; identifier_Loop_length, a 12-bit field that indicates the length of a following identifier_loop; identifier_type, a field that indicates the type of an associated identifier, such as those listed in Table 1 above; URI_length, an 8-bit field specifying the length in bytes of a URI; URI_byte, another 8-bit field, where a string of "uri_char" fields specifies the URI identifying the service, and text information is coded in an 8-bit Unicode Transformation Format (UTF-8); number of identifiers, indicative of the number of identifiers associated with a serviceID within one iteration of the identifier loop; IPv4_src_addr, which is a 32-bit field that specifies an IPv4 unicast/multicast/broadcast source address, where the IPv4 address is fragmented into 4 fields of 8 bits and the first field contains the most significant block of the IPv4 address (dotted notation); IPv4_dst_addr, a 32-bit field that specifies an IPv4 unicast/multicast/broadcast destination address, where the IPv4 address is fragmented into 4 fields of 8 bits and the first field contains the most significant block of the IPv4 address (dotted notation); IPv6_src_addr, a 128-bit field that specifies an IPv6 unicast/multicast/anycast source address, where the IPv6 address is fragmented into 8 fields of 16 bits and the first field contains the most significant block of the IPv6 address (dotted notation); and IPv6_dst_addr, another 128-bit field that specifies an IPv6 unicast/multicast/anycast destination address, where the IPv6 address is fragmented into 8 fields of 16 bits and the first field contains the most significant block of the IPv6 address (dotted notation).

Further still, parameters include: serviceID which identifies a service within the CMMB system; MF_ID which is a field indicative of the identifier of the multiplex frame within the CMMB system; MSF_ID, a field that identifies the multiplex sub-frame within the CMMB system; and Frequency_point_number, an 8-bit field that refers to a sequence number of the frequency point affiliated with a multiplex configuration table and to the MF_ID, MSF_ID and serviceID announced within a particular Service Association Table. Moreover, another embodiment may include parameters such as service_loop_length, a 12-bit field that indicates the length of the following service_loop (not shown). It should be noted that the above-described parameters and field lengths indicated in FIG. 1 are merely exemplary in accordance with one embodiment.

Although IP is conventionally utilized as an interface between the application layer and bearer-specific layer 2 (L2) signaling, various embodiments provide a flexible interface that allows any application layer identifier to be associated with CMMB bearer-specific structures. Although delivery of IP over CMMB is not defined in the CMMB specification(s), such functionality is provided for by allowing for the delivery of, e.g., IP in data sections.

As noted above, FIG. 2 illustrates an end-to-end model of the delivery of OMA BCAST type services through the CMMB system in accordance with one embodiment. According to this one embodiment, the OMA BCAST and/or any other application layer service-specific identifiers are mapped with four CMMB bearer-specific parameters which indicate the location of a service within the CMMB physical layer, e.g., frequency_point_number, MF_ID, MSF_ID and serviceID.

FIG. 2 further illustrates relationships between various domains. That is, 40 timeslots may be configured in the physical domain, e.g., ts0, ts1, ts2 . . . ts39, where ts0 may reserved for signaling purposes. The multiplex domain has defined therein, a maximum of 40 multiplex frames, e.g., MF 0, MF 1, MF n . . . MF m, where MF ID 0 is reserved for signaling and MF ID 1 is reserved for ESG. Each multiplex frame may be made up of one or more multiplex sub-frames, with a maximum of 15 multiplex sub-frames per multiplex frame. For example, FIG. 2 illustrates that multiplex frame MF n is made up of multiplex sub-frames MSF 1 and MSF j, while multiplex frame MF m is made up of its own multiplex sub-frames MSF 1' and MSF j'.

In CMMB, each multiplex sub-frame is equated with a service. Additionally, each multiplex sub-frame may be made up of different sections. For example, MSF 1 is made up of, e.g., a sub-frame header, a video section, an audio section, and a data section, while MSF 1' is made up of its own sub-frame header, video section, audio section, and data section. Each data section can in turn be made up of a maximum of 255 data units. For example, data unit 200 includes data unit 202a and 202b, while data unit 200' includes a data unit 202a' and a data unit 202b'. The type and length of each data unit is indicated in a data section header, for example, data section header 204 of data section 200 and data section header 204' of data section 200'.

Within the IP domain, e.g., in the OMA BCAST IP context, IP packets, such as IP packets 206, are mapped to one or more multiplex sub-frame data sections. Thus a collection of "CMMB services" will form one OMA BCAST ESG domain.

In accordance with another embodiment, a truncated version of the Service Association Table may be utilized, where the Service Association Table lacks the parameters MF_ID, MSF_ID and frequency_point_number. In this situation, a receiver visits a multiplex configuration table to obtain these missing parameters and thus, complete discovery of a service location within the CMMB physical bearer. FIG. 3a illustrates this truncated version of the Service Association Table.

FIG. 3b illustrates yet another version of an exemplary Service Association Table in accordance with yet another embodiment. In this embodiment, the Service Association Table structure includes an inner loop within an identifier loop for enabling several identifiers to bundled together. Hence, the bundled identifiers can be associated with a serviceID parameter. Such a feature avoids the possible redundancy experienced when signaling the same serviceID parameter repeatedly. Table 2 below is also another exemplary Service Association Table defined in accordance with another embodiment.

TABLE 2

| Identifier type type | Description |
| --- | --- |
| IPv4 address | 0x01 |
| IPv6 address | 0x02 |
| private identifier | 0x03 |
| Reserved_future_use | 0x04-0xFF |

Figure 4:
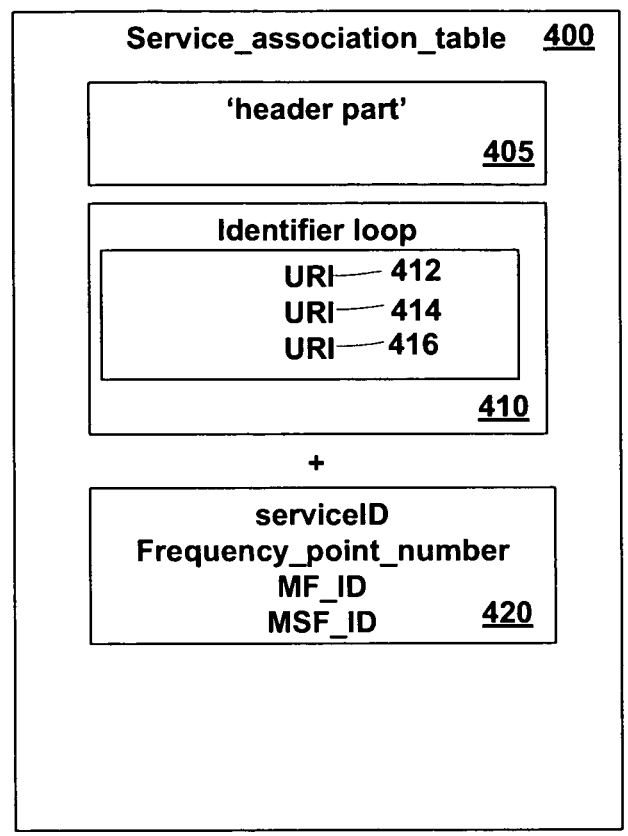
FIG. 4 illustrates an exemplary association effectuated with the exemplary structure and syntax of the Service Association Table of FIG. 3.

The "analog" of the structure and syntax depicted in FIG. 2 is illustrated in a simplified form in FIG. 4 by way of an example association of three URIs 412, 414, and 416 with CMMB bearer-specific parameters, which in this case are the service ID, the frequency_point_number, the MF_ID, and the MSF_ID parameters. That is, a Service Association Table 400 includes a "header part" 405 and an identifier loop 410, in which the URIs 412, 414, and 416 are "announced."

Figure 5:
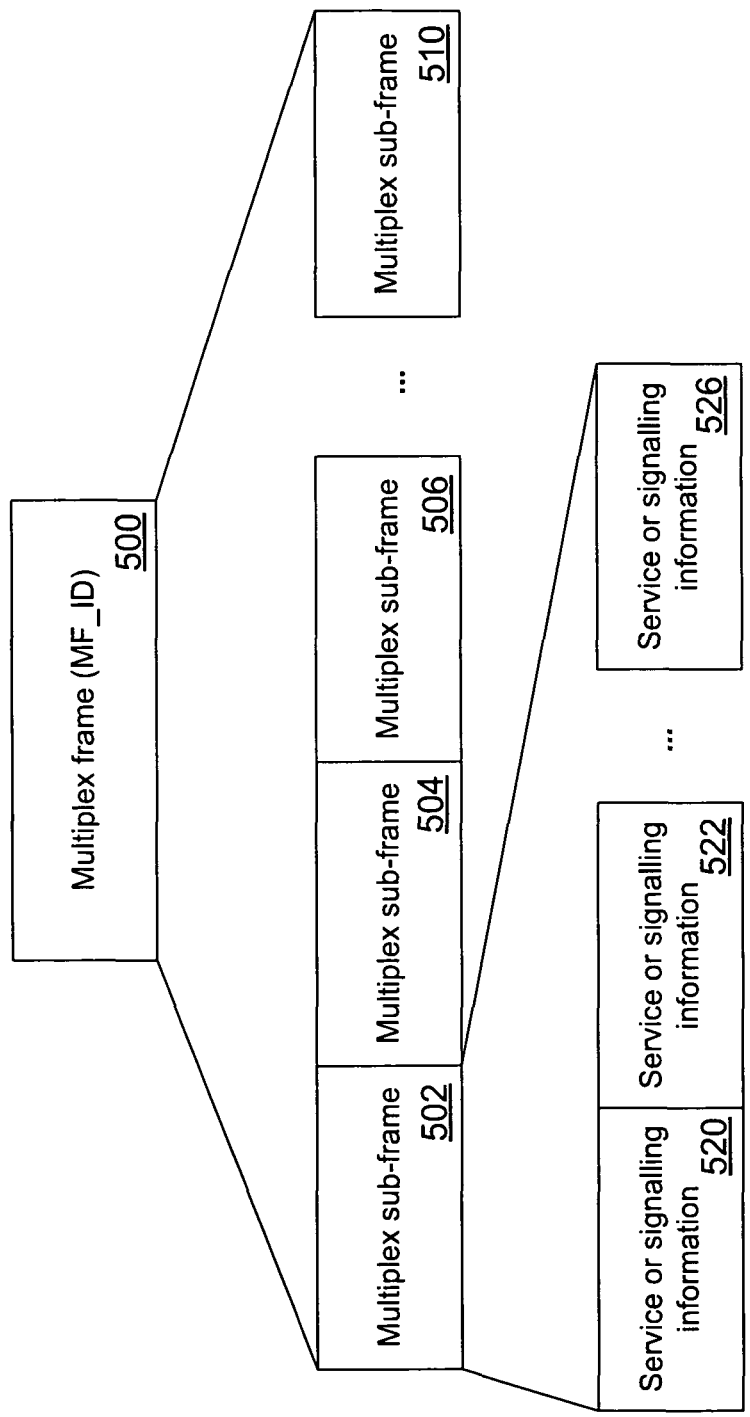
FIG. 5 illustrates exemplary relationships between CMMB elements, multiplex frame, multiplex sub-frame, signaling information, and services in accordance with various embodiments.

The relationship between a multiplex frame, multiplex sub-frames, and a service or signaling information is described with reference to FIG. 5. As was illustrated in FIG. 2, a multiplex frame with a particular MF_ID 500 includes a plurality of multiplex sub-frames, e.g., multiplex sub-frames 502, 504, 506 . . . 510. Each of these multiple sub-frames, e.g., multiplex sub-frame 502 is in turn related to service or signaling information, e.g., service or signaling information 520, 522 . . . 526.

Figure 6:
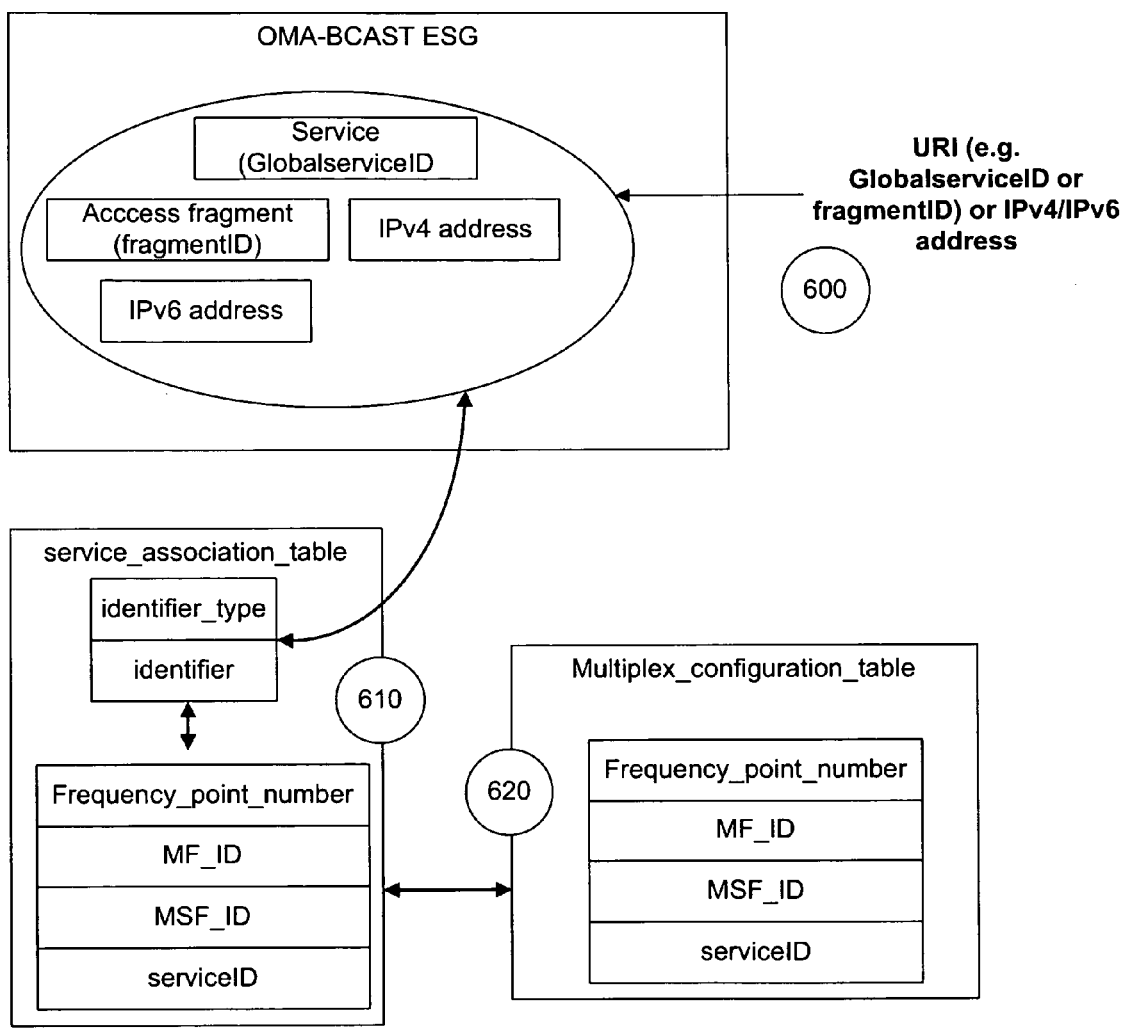
FIG. 6 illustrates an exemplary process for effectuating an end-to-end association of service-related identifiers within an OMA BCAST ESG and CMMB elements in accordance with one embodiment.

FIG. 6 illustrates processes performed in a "3-step approach" to accomplish end-to-end mapping in accordance with various embodiments, where URIs announced within an OMA-BCAST ESG are associated with the CMMB elements/bearer-specific parameters. At 600, identifiers are announced within the OMA BCAST ESG internal structures, and have mutual associations (where, e.g., a system service, content provider, network operator, broadcast service provider, etc. generates and transmits its OMA-BCAST ESG and/or its fragments to a multicast group address). That is, service fragments are associated with services and GlobalserviceIDs, which are further associated with access fragments, etc. An identifier can be any URI or, for example, an IPv4 or IPv6 address. Additionally, any other identifiers may be used, if defined for, e.g., the private field in the Service Association Table.

At 610, the type of identifier is distinguished by an identifier_type-field. Additionally, the identifiers are associated within the Service Association Table with the CMMB elements, i.e. the bearer-specific parameters that define the location of the service within the CMMB physical layer. For simplicity and continuity, the exemplary parameters are the latter parameters discussed above, i.e., MF_ID, MSF_ID, frequency_point_number, and serviceID.

In accordance with one embodiment, such as the embodiment described in relation to FIG. 2, the location of the CMMB bearer-specific parameters frequency_point_number, MF_ID, MSF_ID, and serviceID are all announced within the Service Association Table. Hence, a potential receiver of content, services, etc. indicated in an ESG may obtain access to the content/service(s) based solely on the information carried within the Service Association Table and on the OMA-BCAST ESG.

In accordance with another embodiment described above, the Service Association Table may lack CMMB bearer-specific parameters such as the frequency_point_number, MF_ID, and MSF_ID parameters. In this instance, a receiver is directed to visit one or more CMMB tables to obtain a full mapping between a service announced within the OMA BCAST ESG (i.e., an identifier used for this purpose, e.g., globalserviceID or IP address) and the location within the CMMB physical layer stream. Thus, at 620, the desired multiplex frames and multiplex sub-frames can be filtered from a larger set of multiplex frames by means of an identification provided at 610 that directs the receiver to, e.g., a multiplex_configuration_table containing the requisite frequency_point_number, MF_ID, and MSF_ID parameters.

In addition to service mapping, various embodiments provide bootstrapping for a desired electronic service guide, e.g., a OMA BCAST ESG. That is, various embodiments allow for the discovery of an ESG from a CMMB bearer. It should be noted that the OMA BCAST ESG is used merely as an example, and various embodiments support bootstrapping for various electronic service guides. According to a first embodiment of the electronic service guide bootstrap feature, the electronic service guide bootstrap is identified with the first IP source "src" and/or destination "dst" addresses announced within a first Service Association Table (SAT), where the port number for this bootstrap is fixed. According to a second embodiment of the electronic service guide bootstrapping feature, the electronic service guide bootstrap is identified with the first identifier announced and associated with the CMMB bearer within the SAT. According to a third embodiment of the electronic service guide bootstrapping feature, the electronic service guide bootstrap is identified within a specific Bootstrap Service Association Table (BSAT), which has an identical structure to that of an SAT. However, the BSAT is used only to announce the bootstrap location. The BSAT is always carried within the first multiplex frame (i.e., MF_ID=0).

Figure 7:
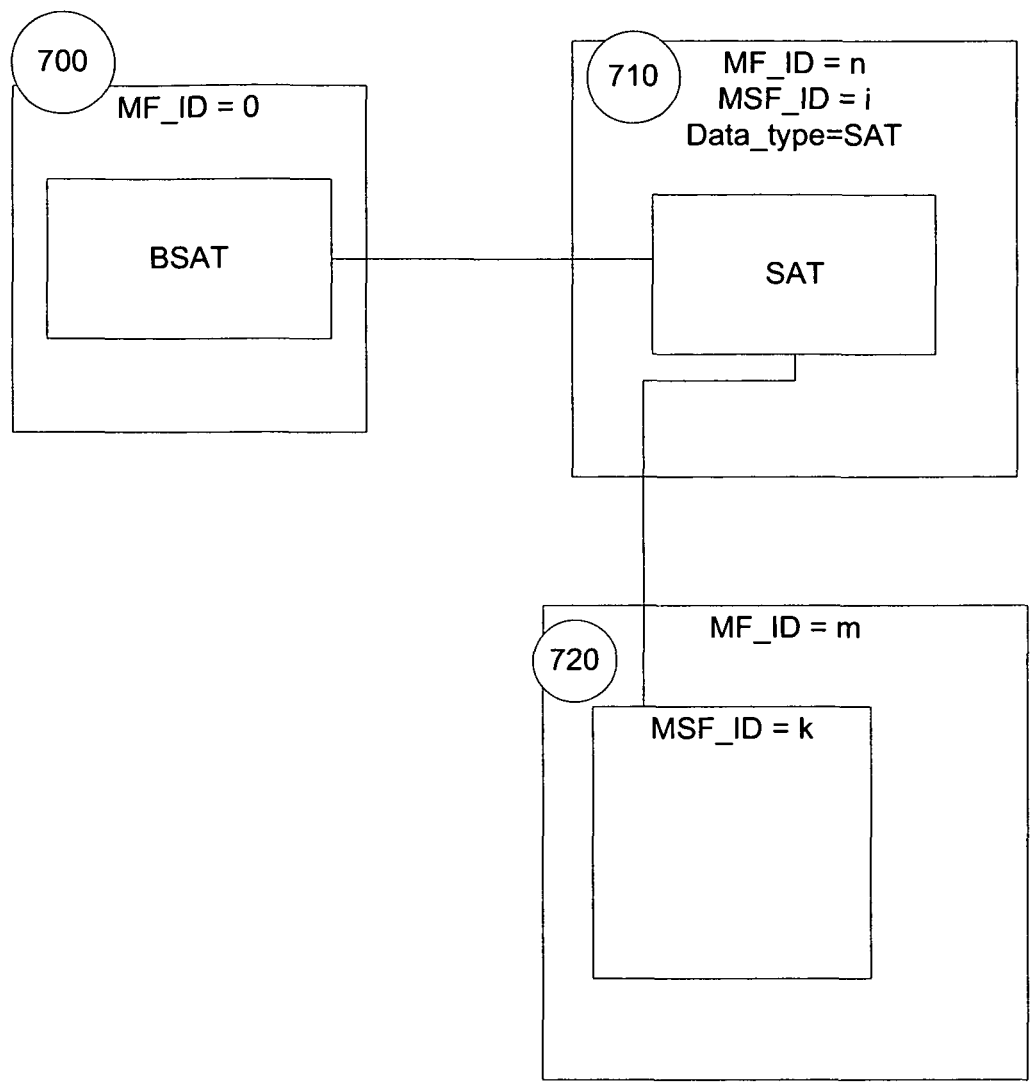
FIG. 7 illustrates an exemplary process for discovering an electronic service guide from a CMMB bearer via a Bootstrap Service Association Table in accordance with various embodiments.

FIG. 7 illustrates an example of service flow discovery via BSAT and SAT. At 700, bootstrap information is discovered from the BSAT, where, e.g., the BSAT is carried within multiplex frame MF 0. After selecting a desired service, the receiver looks for the SAT at 710. At 720, the receiver is able to discover the location of the desired service.

Figure 8:
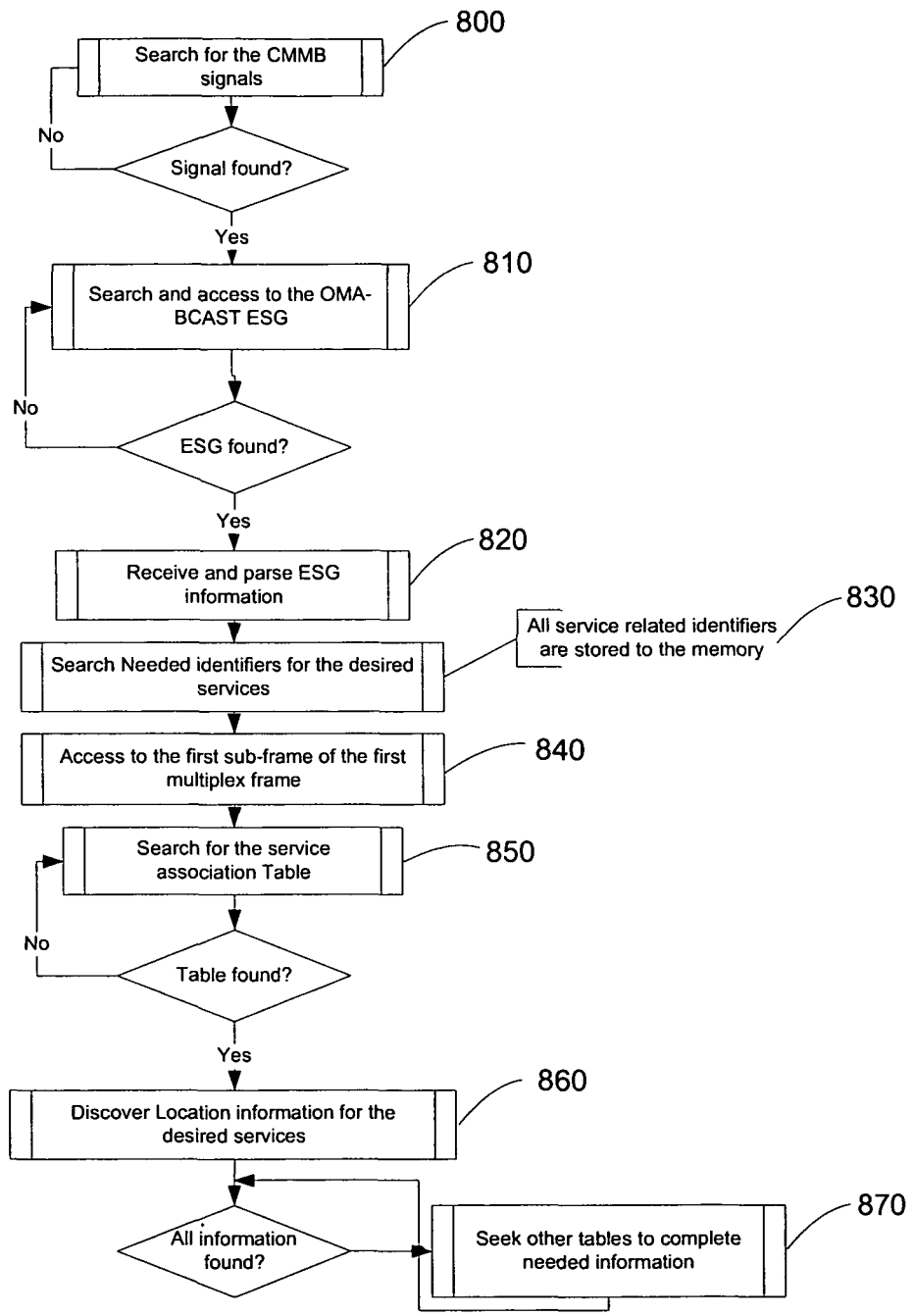
FIG. 8 illustrates an exemplary receiver implementation process for service discovery in accordance with various embodiments.

FIG. 8 is a flow chart illustrating processes performed in service discovery from a receiver perspective in accordance with various embodiments. It should be noted that more or less processes can be performed, and in differing order, to achieve various features and functions described herein. At 800, a receiver searches CMMB signals until one or CMMB signals are found. At 810, from the found CMMB signal, the receiver looks for the OMA BCAST ESG. Upon accessing the OMA BCAST ESG, the receiver parses the ESG and decodes associated metadata at 820. The OMA BCAST ESG can be fixed to a specific serviceID within the CMMB. Additionally, the serviceIDs associated with different electronic service guides are announced within the beginning of a Service Association Table. Alternatively, a Service Association Table may associate the first listed identifier with the OMA BCAST ESG. For example, the first listed identifier would be the "bootstrap identifier." In accordance with still other embodiments and as described above, a BSAT (which has a structure identical to that of an SAT) is utilized. Again, it should be noted that the BSAT is transmitted within the first Multiplex frame (i.e., MF_ID=0). The metadata is then displayed to an end user of the receiver, and the end user may select one or more desired services from the electronic service guide.

At 830, all needed identifiers for the desired service(s) are search for and the receiver stores all of the needed identifiers associated with each desired service. These identifiers can be, e.g., globalserviceID, IP address, accessfragmentID, etc. depending on how the implementation is realized in mapping the CMMB bearer-specific parameters with the higher layer identifiers of the one or more services. At 840, the receiver accesses the first sub-frame of the first multiplex frame within the CMMB (which carries the proposed Service Association Table). At 850, the receiver starts to search for the Service Association Table from the beginning of the first sub-frame of the first multiplex frame. When the Service Association Table is found, the receiver is able to discover the location information for the one or more identifiers associated with the CMMB bearer-specific information and which it has previously stored to memory at 860. If the Service Association Table does not carry all of the requisite parameters for discovering the location of the service(s), the receiver continues to seek and inspect, e.g., a multiplex_configuration_table as described earlier, to complete discovery of the service(s).

It should be noted that in accordance with one embodiment, transmission of the Service Association Table can be via the carriage within the L2 signaling, similar to the CMMB specific tables. In accordance with yet another embodiment, transmission of a proposed Service Association Table can be, e.g., the carriage within the metadata of an electronic service guide. Further still, the Service Association Table or similar information can be delivered through an interaction network, e.g., by way of a network server where the client has subscription. Such a service can be public.

Figure 9:
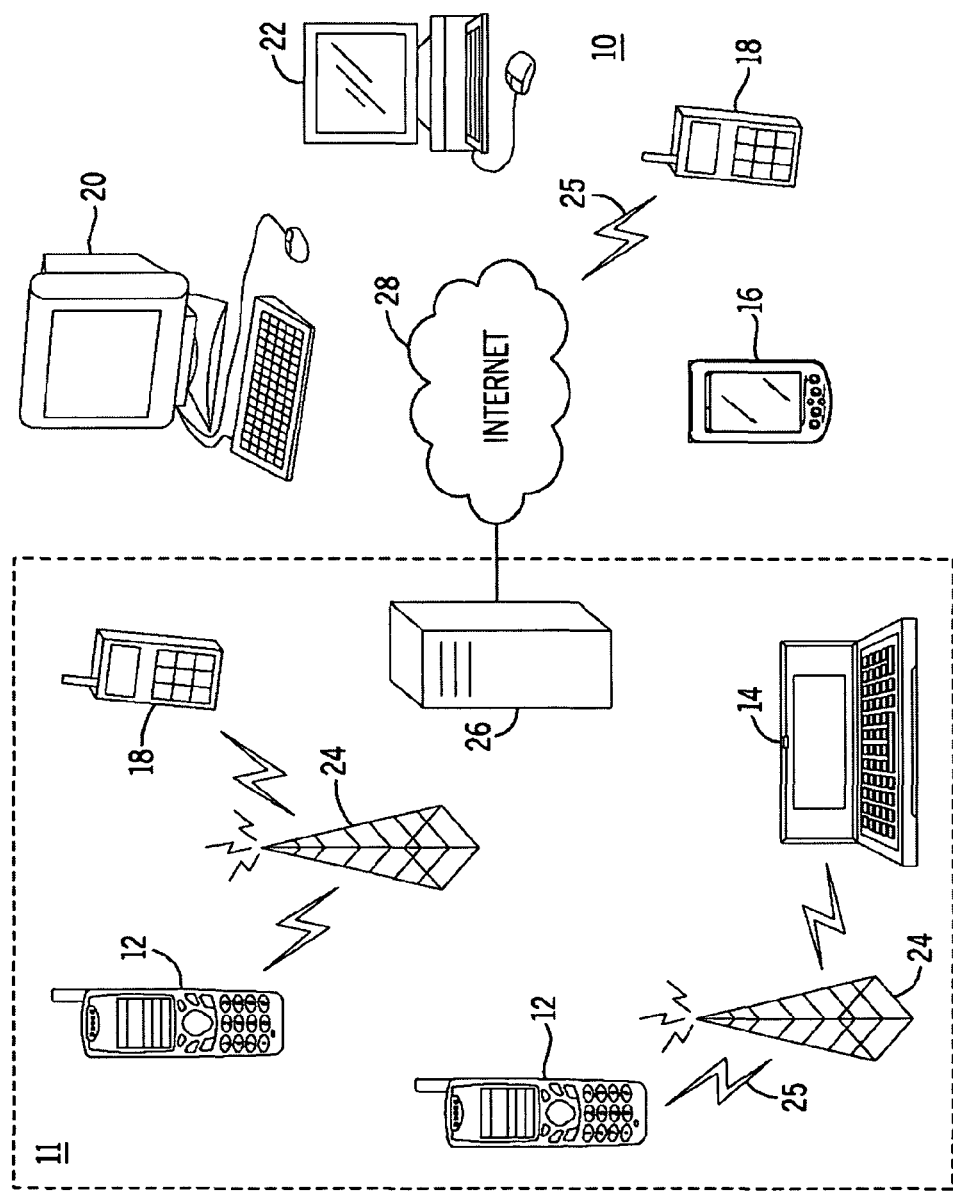
FIG. 9 is an overview diagram of a system within which various embodiments may be implemented.

FIG. 9 shows a system 10 in which various embodiments can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 9 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 9 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments may communicate using various media including, but not limited to, radio, infrared, laser, cable connection, and the like.

Figure 10:
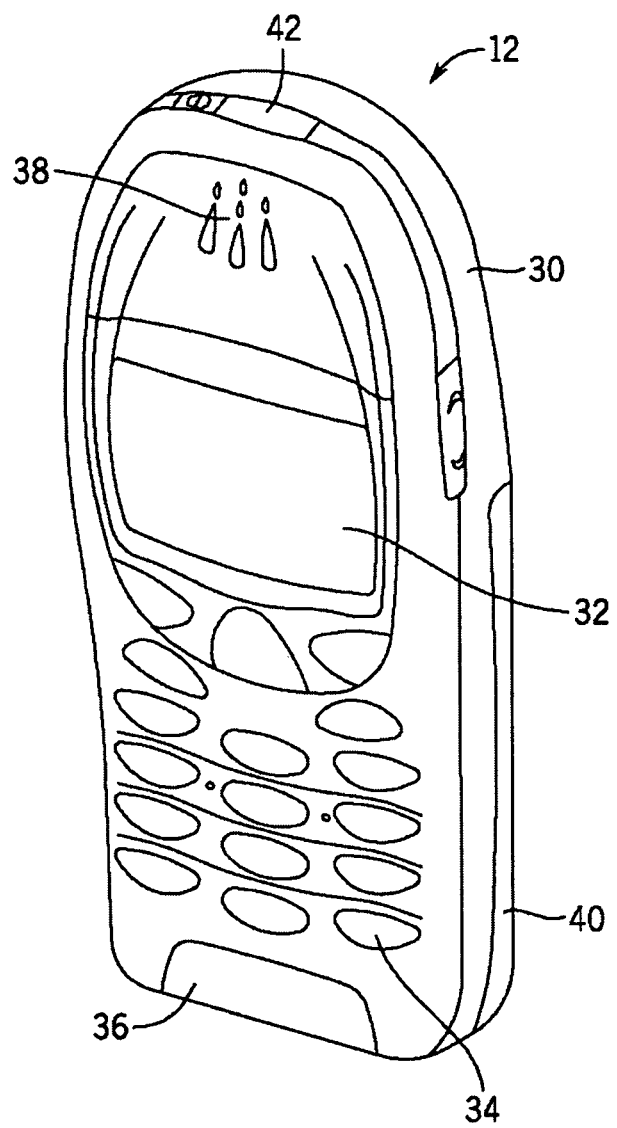
FIG. 10 is a perspective view of an electronic device that can be used in conjunction with the implementation of various embodiments.
Figure 11:
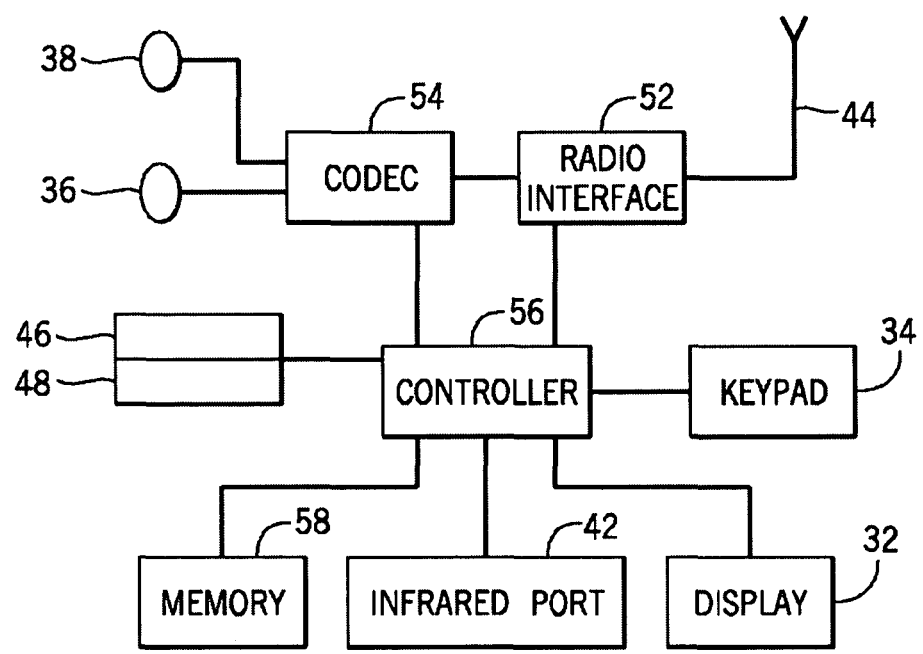
FIG. 11 is a schematic representation of the circuitry which may be included in the electronic device of FIG. 10.

FIGS. 10 and 11 show one representative electronic device 12 within which various embodiments may be implemented. It should be understood, however, that various embodiments are not intended to be limited to one particular type of device. The electronic device 12 of FIGS. 10 and 11 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Various embodiments may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

The foregoing description of embodiments has been presented for purposes of illustration and description. The foregoing description is not intended to be exhaustive or to limit various embodiments to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize various embodiments and with various modifications as are suited to the particular use contemplated. The features of the embodiments described herein may be combined in all possible combinations of methods, apparatus, modules, systems, and computer program products.

What is claimed is:

1. A method, comprising:
announcing at least one service identifier identifying at least one service within an electronic service guide;
distinguishing the at least one service identifier by type;
associating, via a service association table, the at least one service identifier with bearer-specific elements, wherein the bearer-specific elements define a signaled location of the at least one service within a physical location of a bearer and wherein the signaled location comprises a multiplex frame identifier; and
transmitting a multiplex frame identified by the multiplex frame identifier in one or more time slots of a physical layer frame.

2. The method of claim 1, wherein the electronic service guide is an Open Mobile Alliance Mobile Broadcast Services Electronic Service Guide, and the at least one service is service provided over a China Multimedia Broadcasting bearer standard.

3. The method of claim 1, wherein the bearer-specific elements include at least one of a frequency_point_number parameter, a multiplex frame identifier parameter, a multiplex sub-frame identifier parameter, and a service identifier parameter.

4. The method of claim 1 further comprising, upon a determination that at least one of the bearer-specific elements is missing from the service association table, directing a receiver to a multiplex configuration table to obtain a full mapping between the electronic service guide and the at least one service.

5. The method of claim 4, wherein the multiplex configuration table enables the receiver to filter at least one of a desired multiplex frame and a multiplex sub-frame from a larger set of multiplex frames within the service association table.

6. The method of claim 1, wherein the at least one service identifier comprises a Uniform Resource Identifier configured to one of directly and indirectly point to at least one of the at least one service and a fragment of the at least one service within the electronic service guide.

7. The method of claim 1 further comprising, bundling the at least one service identifier with at least another service identifier, and associating the bundle of the at least one service identifier and the at least another service identifier with one of the bearer-specific elements, wherein the one of the bearer-specific elements comprises a service identifier parameter.

8. A computer-readable non-transitory storage medium comprising computer code that when executed by a processor causes an apparatus to:
announce at least one service identifier identifying at least one service within an electronic service guide;
distinguish the at least one service identifier by type;
associate, via a service association table, the at least one service identifier with bearer-specific elements, wherein the bearer-specific elements define a signaled location of the at least one service within a physical location of a bearer and wherein the signaled location comprises a multiplex frame identifier; and
transmit a multiplex frame identified by the multiplex frame identifier in one or more time slots of a physical layer frame.

9. An apparatus, comprising:
one or more computer; and
memory storing computer executable instructions that when executed by the one or more computers cause the apparatus to:
announce at least one service identifier identifying at least one service within an electronic service guide;
distinguish the at least one service identifier by type;
associate, via a service association table, the at least one service identifier with bearer-specific elements, wherein the bearer-specific elements define a signaled location of the at least one service within a physical location of a bearer and wherein the signaled location comprises a multiplex frame identifier; and
transmit a multiplex frame identified by the multiplex frame identifier in one or more time slots of a physical layer frame.

10. The apparatus of claim 9, wherein the electronic service guide is an Open Mobile Alliance Mobile Broadcast Services Electronic Service Guide, and the at least one service is service provided over a China Multimedia Broadcasting bearer standard.

11. The apparatus of claim 9, wherein the bearer-specific elements include at least one of a frequency_point_number parameter, a multiplex frame identifier parameter, a multiplex sub-frame identifier parameter, and a service identifier parameter.

12. The apparatus of claim 9, wherein the computer executable instructions, when executed by the one or more computers, cause the apparatus to, upon a determination that at least one of the bearer-specific elements is missing from the service association table, direct a receiver to a multiplex configuration table to obtain a full mapping between the electronic service guide and the at least one service.

13. The apparatus of claim 12, wherein the multiplex configuration table enables the receiver to filter at least one of a desired multiplex frame and a multiplex sub-frame from a larger set of multiplex frames within the service association table.

14. The apparatus of claim 9, wherein the at least one service identifier comprises a Uniform Resource Identifier configured to one of directly and indirectly point to at least one of the at least one service and a fragment of the at least one service within the electronic service guide.

15. The apparatus of claim 9, wherein computer executable instructions, when executed by the one or more computers, cause the apparatus to bundle the at least one service identifier with at least another service identifier, and associate the bundle of the at least one service identifier and the at least another service identifier with one of the bearer-specific elements, wherein the one of the bearer-specific elements comprises a service identifier parameter.

16. A method comprising:
searching for a bearer signal;
looking for an electronic service guide, parsing the electronic service guide, and decoding metadata from the electronic service guide;

searching for and storing at least one needed service identifier identifying a desired service within the electronic service guide for the desired service;

accessing a first sub-frame of a first multiplex frame within the bearer signal and searching for a service association table; and discovering signaled location information for the at least one needed service identifier within the service association table, the at least one needed service identifier being associated with bearer-specific elements defining the signaled location information of the desired service within a physical location of the bearer signal and wherein the signaled location information comprises a multiplex frame identifier.

17. The method of claim 16 further comprising, upon a determination that at least one of the bearer-specific elements is missing from the service association table, accessing and inspecting a multiplex configuration table to complete service discovery.

18. The method of claim 16, wherein the electronic service guide is an Open Mobile Alliance Mobile Broadcast Services Electronic Service Guide, and the desired service is a service provided over a China Multimedia Broadcasting bearer standard.

19. The method of claim 16, wherein the bearer-specific elements include at least one of a frequency_point_number parameter, a multiplex frame identifier parameter, a multiplex sub-frame identifier parameter, and a service identifier parameter.

20. The method of claim 16, wherein the electronic service guide is fixed to a specific service identifier of the bearer signal.

21. The method of claim 16, wherein a bootstrap identifier of the electronic service guide is associated with a first identifier of the at least one needed service identifier within the service association table.

22. The method of claim 16, wherein a bootstrap identifier of the electronic service guide is associated with at least one of Internet Protocol source and Internet Protocol destination addresses announced within the service association table.

23. The method of claim 16, wherein a bootstrap identifier of the electronic service guide is associated with a bootstrap service association table carried within the first multiplex frame of the bearer signal.

24. The method of claim 23 further comprising, looking for and accessing the service association table associated with the bootstrap association service table, and discovering a location of the desired service.

25. The method of claim 16 further comprising, upon decoding the metadata, displaying the metadata to an end-user for selection of the desired service.

26. The method of claim 16, wherein the service association table is transmitted within a carriage of one of layer 2 signaling of the bearer signal, the metadata of the electronic service guide, and an interaction network.

27. A computer-readable non-transitory storage medium comprising computer code that when executed by a processor, causes an apparatus to:
search for a bearer signal;
look for an electronic service guide, parse the electronic service guide, and decode metadata from the electronic service guide;
search for and storing at least one needed service identifier identifying a desired service within the electronic service guide for the desired service;
access a first sub-frame of a first multiplex frame within the bearer signal and search for a service association table; and
discover signaled location information for the at least one needed service identifier within the service association table, the at least one needed service identifier being associated with bearer-specific elements defining the signaled location information of the desired service within a physical location of the bearer signal and wherein the signaled location information comprises a multiplex frame identifier.

28. An apparatus comprising:
one or more computer; and
memory storing computer executable instructions that when executed by the one or more computers cause the apparatus to:
search for a bearer signal;
look for an electronic service guide, parse the electronic service guide, and decode metadata from the electronic service guide;
search for and store at least one needed service identifier identifying a desired service within the electronic service guide for the desired service;
access a first sub-frame of a first multiplex frame within the bearer signal and search for a service association table; and
discover signaled location information for the at least one needed service identifier within the service association table, the at least one needed service identifier being associated with bearer-specific elements defining the signaled location information of the desired service within a physical location of the bearer signal and wherein the signaled location information comprises a multiplex frame identifier.

29. The apparatus of claim 28, wherein the computer executable instructions, when executed by the one or more computers, cause the apparatus to, upon a determination that at least one of the bearer-specific elements is missing from the service association table, access and inspect a multiplex configuration table to complete service discovery.

30. The apparatus of claim 28, wherein the electronic service guide is an Open Mobile Alliance Mobile Broadcast Services Electronic Service Guide, and the desired service is a service provided over a China Multimedia Broadcasting bearer standard.

31. The apparatus of claim 28, wherein the bearer-specific elements include at least one of a frequency_point_number parameter, a multiplex frame identifier parameter, a multiplex sub-frame identifier parameter, and a service identifier parameter.

32. The apparatus of claim 28, wherein the electronic service guide is fixed to a specific service identifier of the bearer signal.

33. The apparatus of claim 28, wherein a bootstrap identifier of the electronic service guide is associated with a first identifier of the at least one needed service identifier within the service association table.

34. The apparatus of claim 28, wherein a bootstrap identifier of the electronic service guide is associated with at least one of Internet Protocol source and Internet Protocol destination addresses announced within the service association table.

35. The apparatus of claim 28, wherein a bootstrap identifier of the electronic service guide is associated with a bootstrap service association table carried within the first multiplex frame of the bearer signal.

36. The apparatus of claim 35, wherein the computer executable instructions, when executed by the one or more computers, cause the apparatus to look for and access the service association table associated with the bootstrap association service table, and discover a location of the desired service.

37. The apparatus of claim 28, wherein the computer executable instructions, when executed by the one or more computers, cause the apparatus to, upon decoding the metadata, display the metadata to an end-user for selection of the desired service.

38. The apparatus of claim 28, wherein the service association table is transmitted within a carriage of one of layer signaling of the bearer signal, the metadata of the electronic service guide, and an interaction network.

39. The apparatus of claim 28, further comprising a receiver.

\* \* \* \* \*

UNITED STATES PATENT AND TRADEMARK OFFICE
CERTIFICATE OF CORRECTION

| | | |
|---|---|---|
| PATENT NO. | : 8,966,543 B2 | Page 1 of 1 |
| APPLICATION NO. | : 12/240779 | |
| DATED | : February 24, 2015 | |
| INVENTOR(S) | : Väre et al. | |

It is certified that error appears in the above-identified patent and that said Letters Patent is hereby corrected as shown below:

In the Claims

In Column 15, Claim 38, Line 13
Please delete "of layer signaling" and replace with --of layer 2 signaling--.

Signed and Sealed this
Twenty-ninth Day of September, 2015

Michelle K. Lee
*Director of the United States Patent and Trademark Office*